United States Patent [19]

Belsky et al.

[11] 4,405,118

[45] Sep. 20, 1983

[54] APPARATUS FOR REFINING MOLTEN METALS FROM INSOLUBLE IMPURITIES

[76] Inventors: Valentin I. Belsky, ulitsa Petukhova, 68, kv. 61; Serafim N. Suturin, ulitsa Kozhevnikova, 2, kv. 22; Gennady I. Orlov, ulitsa Vatutina, 27, kv. 20; Anatoly V. Dolgov, Morskoi prospekt, 36, kv. 30; Boris K. Goncharov, ulitsa Zorge, 105, kv. 38; Vladimir I. Antonov, ulitsa Petukhova, 26, kv. 47; Jury A. Naryshkin, ulitsa Bljukhera, 7, kv. 55, all of Novosibirsk, U.S.S.R.

[21] Appl. No.: 341,506

[22] Filed: Jan. 21, 1982

[51] Int. Cl.³ .............................................. C22B 9/02
[52] U.S. Cl. .................................. 266/227; 266/231; 266/204
[58] Field of Search ............... 266/227, 228, 231, 204, 266/233, 235, 236, 238, 135; 233/3, 4; 210/360.1

[56] References Cited

U.S. PATENT DOCUMENTS 3,374,089 3/1968 Robinson, Jr. et al. ................ 75/68
4,032,122 6/1977 Anders ................................. 266/169

*Primary Examiner*—L. Dewayne Rutledge
*Assistant Examiner*—Christopher W. Brody
*Attorney, Agent, or Firm*—Steinberg & Raskin

[57] ABSTRACT

The apparatus for refining molten metals from insoluble impurities comprises a housing with a detachable base having an opening, a filtering device with a filtering member, mounted on the housing and operatively passing through the opening in the base, mechanisms for actuating the filtering member through rotation about its longitudinal axis and reciprocation along this axis, and a device for removing impurities from the apparatus. In accordance with the invention, a closed-loop trough is made in the detachable base around the opening for the passage of the filtering device, the device for removing impurities from the apparatus being accommodated within this trough.

5 Claims, 4 Drawing Figures

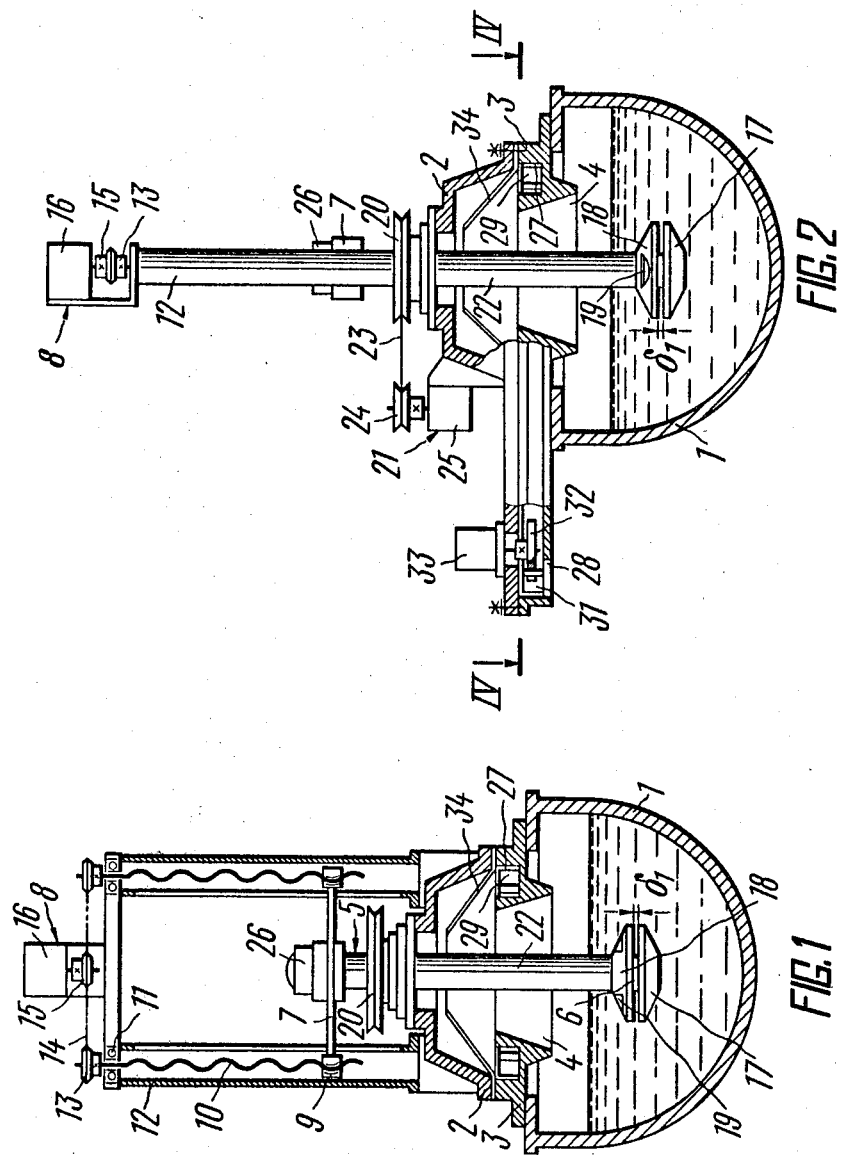

APPARATUS FOR REFINING MOLTEN METALS FROM INSOLUBLE IMPURITIES

The invention relates to production of non-ferrous metals, and more particularly relates to apparatus for refining molten metals from insoluble impurities, or dross.

The invention can be utilized to utmost effectiveness in refining tin, lead and their alloys.

Among the most commonly used techniques of refining tin, lead and their alloys is pyrorefining based on the phenomenon of the crystalline compounds of the impurities forming at certain temperatures, which compounds are insoluble in the melt. These compounds in the form of either solid matter or foam are removed off the surface of the molten metal either manually or with aid of primitive mechanisms. The dross thus removed, however, contains considerable quantities of the molten metal, which fact complicates subsequent treatment of the dross and increases the waste of the metal being refined.

The most efficient technique of separating the liquid and solid phases of a melt is centrifugal filtration of the latter.

There is known an apparatus for centrifugal filtration of molten metals. This apparatus has a housing having mounted thereon the filtering device and a drive for rotating the latter. The filtering device includes a filtering member in the form of a drum having slits in its periphery. The apparatus operates as follows. It is installed adjacent to a tank containing the molten unpurified metal. A specific device is operated to pour the molten metal from the tank into the rotating filtering member, and the metal is filtered out through the slits in the periphery of the filtering member. The filtered-out metal flows down the metal-receiving member into a specifically provided vessel, whereas the insoluble impurities are retained in the filtering device.

However, in operation of this apparatus, the composition of the filtered-out metal is greatly dependent on the composition of the initial metal. In practice, to obtain sufficiently pure metal the latter has to be passed through the apparatus twice, and in some cases even more times, each successive passing being conducted at a lower temperature. This takes additional time, to say nothing of the increased metal waste and energy consumption.

The highest efficiency in refining molten metals from insoluble impurities has been so far attained with apparatus for centrifugal filtration of molten metals, belonging to the submersible type.

There is known an apparatus for centrifugal refining of molten metals from insoluble impurities (cf. the SU Inventor's Certificate No. 463,334). This apparatus includes a housing with a bottom part provided with apertures in the periphery thereof for discharging the impurities. The apparatus comprises a filtering device with a filtering member. The filtering member includes two tapering plates facing each other by their bases, with a gap left therebetween. The upper plate has ports for introducing the molten metal into the filtering device. The apparatus further comprises a mechanism for rotating the filtering device and a mechanism for reciprocating the latter. The apparatus operates as follows.

The apparatus is installed directly on the refining pot containing the molten metal. The filtering member is periodically submerged into the molten metal by the reciprocation mechanism. The rotating mechanism is activated to rotate the filtering device at a required angular speed. The metal enters the filtering member from the refining pot through the ports made in the upper plate. Once within the filtering member, the molten metal is forced out by the centrifugal forces through the gap between the bases of the plates, back into the refining pot, while the insoluble impurities or dross remain within the filtering member in the form of crystalline residue.

As the filtering member becomes filled with the dross, the filtering device with some molten metal remaining therein is lifted from the pot, the gap between the plates of the filtering member is significantly increased, and the dross is propelled by the centrifugal forces from the filtering member into the housing of the apparatus. Then the gap between the plates is reduced once again to the initial value, and the filtering member is submerged into the molten metal, whereafter the above cycle is repeated.

The dross discharged into the housing of the apparatus flows by gravity from the apparatus through apertures provided in the bottom part of the housing, adjacent to the periphery thereof, beyond the confines of the refining pot.

As the metal is being refined in this apparatus, the filtering member is submerged in the metal being refined, whereby it is not necessary to heat specifically the filtering device and to maintain its temperature within a specified range. Furthermore, there is no necessity to have a charging or pouring-in device, since the molten metal enters the filtering member by gravity. Metal losses caused by oxidation are likewise reduced, since sputtering of the metal leaving the filtering member in contact with the atmosphere has been eliminated.

However, in operation of this apparatus there are no provisions for continuously removing the dross therefrom and conveying it to a specified point outside the apparatus. Some metal is lost with the dross propelled from the filtering member, as no squeezing of the dross prior to its discharge from the filtering member takes place.

There is known yet another apparatus for centrifugal refining of molten metals from insoluble impurities (cf. "Non-Ferrous Metals"—"Tsvetnye Metaly"—Magazine, in Russian, No. 7,1977, pp. 5–8).

The apparatus comprises a housing with a detachable base having an opening made therethrough, and a filtering device. The filtering device has a filtering member including two tapering plates facing each other by their bases, with a gap left therebetween. The upper plate has ports for introduction of the metal into the filtering member. The apparatus further comprises mechanisms for rotating the filtering device about its vertical axis and for reciprocating it along this axis, and a device for discharging the dross from the apparatus, located at the side of the filtering device.

This apparatus is operated as follows:

The apparatus is installed on the refining tank containing therein the molten metal. The filtering member is lowered and submerged in the molten metal by the reciprocation mechanism. The rotating mechanism is activated to rotate the filtering device at a specified angular speed. The metal enters the filtering member from the refining tank through the ports in the upper plate. The centrifugal forces drive the molten metal filling the filtering member through the gap between the bases of the plates back into the refining tank, while the dross remains in the filtering member in the form of insoluble crystalline residue.

When the filtering member becomes filled with the dross, the filtering device is lifted above the surface of the molten metal being refined. To attain a higher efficiency of removing the remaining molten metal from the filtering member, the angular speed of the rotation of the filtering device is increased. Then the filtering device is lifted even higher, and the gap between the plates of the filtering member is significantly increased. The centrifugal forces propel the dross from the filtering member onto the device for their removal, which directs it into a specifically provided receptable. Then the gap between the plates is reduced to the initial value, the filtering member is lowered once again into the molten metal, and the cycle is repeated. The refining cycles are repeated as the temperature of the melt is gradually lowered, until the required degree of purification of the metal is attained.

In this apparatus the loss of metal has been reduced, owing to the introduction of the additional operation, i.e. the squeezing of the dross at the stepped-up speed of rotation of the filtering device. Furthermore, the provision of the special device has enabled the dross to be discharged into a specific receptacle outside the apparatus, which enhances the maintenance of the latter. However, with the device for removing the dross (the impurities) being located at the side of the filtering member, some portion of the dross, directed into the working zone of the removing device, is discharged from the apparatus, the remaining dross being not removed and returning once again into the refining tank with the molten metal.

As the remaining liquid metal is removed from the dross (the squeezing of the dross), some liquid metal finds its way with the dross into the housing of the apparatus and into the device for removing the dross, which results in increased metal loss and affects the reliability of the performance of the device for removing the dross and of the apparatus, as a whole.

The housing of the apparatus is subjected to intense abrasive and chemical wear on account of the action of the dross propelled against the housing of the apparatus, which has been found to curtail the service life of the apparatus.

Besides, the housing of the apparatus is significantly heated by the heat radiation coming from the surface of the molten metal, which impairs the working conditions of the mechanisms mounted on the housing, the reliability of the performance of the apparatus and the working environment of the personnel.

It is the main object of the present invention to provide an apparatus for refining molten metals for insoluble impurities, with the means for removing the impurities from the apparatus having a construction which increased the efficiency of such removal.

It is a not less important object of the present invention to provide an apparatus for refining molten metals from insoluble impurities, with the means for removing the impurities from the apparatus having a construction which will enhance the reliability of the performance of the apparatus.

It is another object of the present invention to provide an apparatus for refining molten metals from insoluble impurities, with the means for removing the impurities from the apparatus having a construction which will prolong the service life of the apparatus.

These and other objects are attained in an apparatus for refining molten metal from insoluble impurities, comprising a housing having a detachable base with an opening therethrough, a filtering device provided with a filtering member and mounted on the housing and adapted to operatively pass through the opening in the base, mechanisms for driving the filtering member through rotation about the longitudinal axis thereof and through reciprocation along this axis and a device for removing impurities from the apparatus, in which apparatus, in accordance with the invention, the detachable base has a closed-loop trough formed therein encompassing the opening for the passage of the filtering device, the device for removing impurities from the apparatus being accommodated in this trough.

The provision of the closed-loop trough in the detachable base about the opening for the passage of the filtering device and the accommodation of the impurity-removing device in this trough enable:

a removal of the impurities from the apparatus with a higher efficiency, since practically the entire amount of the impurities propelled at the discharge from the filtering member of the filtering device at the discharge stage finds its way into the working zone of the impurity-removing device;

a simplification of the construction of the apparatus, to enhance the reliability of its performance and to prolong its service life, since, with the impurity-removing device accommodated in the trough, it requires no specific supporting and guiding members, for these functions are performed by the walls of the trough.

It is expedient that an aperture for discharging the impurities be made in one of the surfaces of the trough. With an impurity discharge opening provided in one of the surfaces of the trough, e.g. in its bottom surface, it becomes possible to continuously discharge all the impurities finding their way into the trough from the apparatus, into a specifically provided receptacle situated in an appropriate place, and thus to preclude failures in the operation of the impurity-removing device caused by excessive accumulation of the impurities in the trough. This, in its turn, would further enhance the reliability of the performance of the apparatus and improve the working environment of the personnel.

It is further expedient that a downwardly flaring tapering screen be accommodated in the housing of the apparatus, directly overlying the closed-up trough and arranged coaxially with the filtering device. The provision of the downwardly flaring tapering screen directly above the closed-loop trough, coaxially with the filtering device, enables the housing of the apparatus to be protected against intense abrasive and chemical wear caused by the discharge of the dross and to prolong the service life of the apparatus. This also significantly reduces the heating of the housing of the apparatus by the heat radiation coming from the surface of the molten metal, which enhances the working conditions of the mechanisms mounted on the housing, steps up the reliability of the performance of the apparatus and improves the working environment of the personnel. Moreover, the impurities propelled by the filtering member are deflected by the tapering screen into the trough, which adds to their complete removal.

It is also expedient that the device for discharging impurities from the apparatus should include a closed multilink conveyor with scooping blades. With the impurity-discharging device including a closed multilink conveyor with scooping blades, the complete withdrawal of the impurities finding their way into the trough is provided for, while there is excluded the jamming of the device by impurities heated to a temperature above the melting point of the metal being refined, whereby the reliability of the performance of the apparatus, as a whole, is enhanced.

It is not less expedient that the opening in the base for the passage of the filtering device be of a downwardly flaring tapering shape. This enables all the liquid metal propelled from the filtering member as the dross is squeezed out to be returned into the refining tank, by repelling the flying metal droplets toward the refining tank. Furthermore, this prevents the ingress of the metal into the housing of the apparatus, onto the impurity-removing device, whereby the performance reliability of this device is enhanced, and the loss of the metal being refined is minimized.

The above specified structural features yield the prerequisites for increasing the efficiency of the removal of the impurities from the apparatus, for enhancing the reliability of its performance and for prolonging its service life.

For the present invention to be better understood, given hereinbelow is a description of an embodiment therein in an apparatus for refining molten metals from insoluble impurities, with reference being made to the accompanying drawings, wherein:

FIG. 1 is a sectional general schematic view of the apparatus for refining molten metals from insoluble impurities, embodying the invention;

FIG. 2 is a sectional side (left-hand) general view of the apparatus for refining molten metals from insoluble impurities, embodying the invention;

Figure 3:
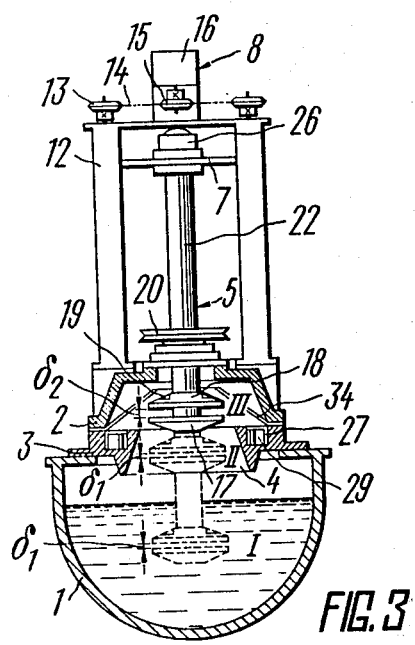
FIG. 3 is a sectional general view of the apparatus for refining molten metals from insoluble impurities, embodying the invention, as shown in FIG. 1, with the filtering member being shown as occupying three positions designated I, II and III.

The apparatus for refining molten metals from insoluble impurities is installed on a tank 1 (FIG. 1) containing molten metal.

The apparatus for refining molten metals from insoluble impurities comprises a housing 2 with a detachable base 3. The base 3 has an opening 4 made therethrough. In the presently described embodiment this opening 4 is of a downwardly flaring tapering shape or frustoconical shape. However, it may have any other suitable shape. Mounted in the housing 2 coaxially with the opening 4 is a filtering device 5. The lower part of the filtering device 5 carries a filtering member 6 submersible in the melt. The upper part of the filtering device is rotatably mounted in the crosspiece 7 of a mechanism 8 adapted to reciprocate the filtering member 6. The crosspiece 8 is suspended with aid of nuts 9 on the respective lead screws 10 set in bearings 11 mounted on an inverted II-shaped upright 12. The II-shaped upright 12 is supported by the housing 2.

The lead screws 10 carry sprockets 13 engaged by a drive chain 14 providing for synchronous rotation of the lead screws 10. The chain 14 further engages the sprocket 15 of a drive 16 forming part of the mechanism 8 for reciprocating the filtering device 5. The filtering member 6 includes two plates 17 and 18, with a gap $\delta_1$ left between the bases of the plates 17 and 18. The upper plate 18 has ports 19 made therein for introducing the molten metal into the filtering member 6. Rotatably mounted on the housing 2, coaxially with the filtering device 5, is a pulley 20 belonging to a mechanism 21 for rotation. The pulley 20 encompasses a shaft 22 on which there is mounted the filtering member 6, with provisions for transmitting the driving torque to it and for reciprocation along its axis of rotation in any suitable known per se manner. The pulley 20 (FIG. 2) is connected via a flexible driving member 23 with the pulley 24 of a drive 25 belonging to the rotating mechanism 21. Mounted in the upper part of the filtering device 5 is a device 26 for significantly varying the value of the gap between the bases of the plates 17 and 18 in operation of the apparatus. This device 26 can be of any suitable known per se structure.

Figure 4:
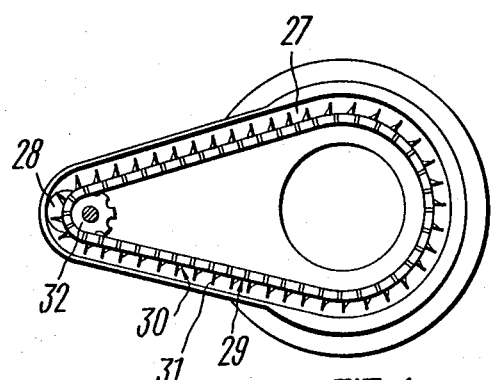
FIG. 4 is a sectional view taken along line IV—IV of FIG. 2.

A closed-loop trough 27 is formed in the base 3 proximate to opening 4. The trough 27 has an aperture 28 formed in the end of its lower wall for discharging the dross. The trough 27 accommodates an impurity-removing device 29 (FIG. 4) including a closed-loop multilink conveyor 30 with scooping blades 31. The conveyor 30 is in engagement with a driving sprocket 32 mounted on the shaft of a drive 33 belonging to the device 29. Mounted in the housing 2, coaxially with the filtering device 5, is a tapering, downwardly flaring screen 34 (FIG. 4).

The apparatus for refining molten metals from insoluble impurities is operated as follows.

The apparatus is mounted by its base 3 onto the tank 1 containing the molten metal, e.g. unpurified tin. The device 29 for discharging the impurities is activated by energizing the drive 33 to actuate the conveyor 30 along the trough 27 with aid of the driving sprocket 32. The mechanism 8 is operated to lower the filtering member 6 of the filtering device 5, with rotation being transmitted from the drive 16 through the driving sprocket 15, chain 14 and sprockets 13 to the lead screws 10. With the lead screws 10 rotating in the bearings 11, the nuts 9 with the crosspiece 7 carried thereby and the filtering device supported by this crosspiece 7 are lowered along the upright 12 to submerge the filtering member 6 in the melt (position I in FIG. 3). The molten metal flows into the filtering member 6 through the ports 19. The mechanism 21 is activated to rotate the filtering member 6 of the filtering device 5. This rotation is transmitted from the drive 25 via the pulley 24, the flexible connection 23, the pulley 20 and the shaft 22.

The internal space of the filtering member 6 is gradually filled with the impurities, whereafter the mechanism 8 is activated to lift the filtering member 6 into position II (FIG. 3). To increase the efficiency of separating the remaining molten metal from the dross, the angular speed of the rotation of the filtering member 6 is at this stage increased by controlling the speed of the drive 25 belonging to the rotating mechanism 21. The centrifugal forces propel the metal in droplets onto the tapering surface of the opening 4, whereby they are deflected down, back into the tank 1, without getting inside the housing 2.

With the walls defining the opening 4 being tapering and downwardly flaring, all the molten metal propelled from the filtering member 6 at the dross-squeezing stage returns into the refining tank 1 by being repelled toward this tank 1. Moreover, this precludes the ingress of the molten metal inside the housing 2 of the apparatus, onto the impurity-removing device 29, which enhances the performance reliability of this device 29 and minimizes the loss of metal being refined.

The filtering member is then lifted into position III. The device 26 is operated to significantly enlarge the gap between the plates 17 and 18, to value $\delta_2$. The dross is propelled from the filtering member 6 onto the downwardly tapering screen 34 which repels it into the trough 27 where the conveyor 30 with the scooping blades 31 moves.

Thus, the impurities charged into the trough 27 are continuously grasped by the scooping blades 31 of the conveyor 30 and discharged through the aperture 28 into a specifically provided receptacle (not shown).

With the screen 34 of the downwardly flaring tapering shape being mounted in the housing 2 of the apparatus above the closed-loop through 27, coaxially with the filtering device 5, the housing 2 of the apparatus is protected against intense abrasive and chemical wear by the dross being discharged, which prolongs the service life of the apparatus. Furthermore, the heating of the housing 2 of the apparatus by heat radiation coming from the surfaces of the molten metal in the tank 1 is significantly reduced, which enhances the working conditions of the mechanisms mounted on the housing 2, the reliability of the performance of the apparatus and the working environment of the personnel. Moreover, the impurities propelled from the filtering member 6 are repelled by the tapering screen 34 back into the trough 27, which adds to their complete withdrawal.

With the closed-loop trough 27 accommodated in the detachable base 3 about the opening 4 for the passage of the filtering device 5 from the filtering member 6, and with the impurity-removing device 29 accommodated within this trough:

the impurities are removed from the apparatus with a higher efficiency, since practically the entire amount of the impurities thrown out by the rotating filtering member 6 of the filtering device 5 at the discharge stage falls into the working zone of the impurity-removing device 29 and is advanced along the trough 27 toward the impurity discharge opening 28;

the impurity-removing device 29 accommodated in the trough 27 is not subjected to the mechanical action of the dross being propelled from the filtering member 6 and possessing high kinetic energy; instead, it is acted upon by the dross that has lost a high proportion of its energy by having impinged on the screen 34, which enhances the performance reliability and prolongs the service life of the impurity-removing device and of the apparatus, as a whole:

the impurity-removing device 29 accommodated in the trough 27 requires no specific guiding and supporting elements, for these functions are performed by the walls of the trough 27, which simplifies the construction of the apparatus, enhances its performance reliability and prolongs its service life.

With the device 29 for removing impurities from the apparatus including the closed-loop multilink conveyor 30 with the scooping blades 31, more complete withdrawal of the impurities directed into the trough 27 is provided for. Moreover, there is excluded the jamming of the device 29 by impurities heated to a temperature in excess of the melting point of the metal being refined and finding their way in the device 29.

With the opening 28 for discharging the impurities provided in one of the surfaces of the trough 27, e.g. in its bottom surface, it is possible to discharge the entire amount of the impurities directed into the trough 27 into a specific receptacle situated in the most convenient place. This precludes failures of the impurity-removing device 29, caused by excessive accumulation of the impurities in the trough 27, which enhances the performance reliability of the apparatus and facilitates the task of the personnel.

Upon the dross having been discharged from the filtering member 6, the gap between the bases of the plates 17 and 18 is reduced to the initial value (value $\delta_1$) by operating the device 26, and the mechanism 8 is operated to submerge the filtering member 6 once again into the molten metal, and the abovedescribed cycle is repeated. The refining cycles accompanied by gradual lowering of the temperature of the melt are repeated until the required degree of purification of the metal is attained.

What we claim is:

1. Apparatus for refining molten metals from insoluble impurities, comprising:
    a housing associated with a removable base in which an opening is formed;
    an elongate filtering device mounted on said housing and passing through said opening formed in said base;
    a filtering member mounted on an end region of said filtering device;
    means mounted on said housing for rotating said filtering member about an axis of rotation;
    means mounted on said housing for longitudinally reciprocating said filtering member over a path of travel which passes through said opening formed in said base;
    a trough formed in said removable base of said housing, said trough forming a closed loop and extending around said opening formed in said base through which said filtering member passes; and
    means situated within said closed-loop trough for engaging and removing impurities from said apparatus which are discharged from said filtering member into the closed-loop trough.

2. The combination of claim 1 wherein said trough includes at least two walls and wherein an aperture for discharging the impurities is formed through one of said walls of said trough.

3. The combination of claim 1 wherein a downwardly flaring substantially frustoconical screen is situated in said housing directly above said closed-loop trough substantially coaxially with said filtering device.

4. The combination of claim 1 wherein said means for removing impurities from the apparatus includes a closed multilink conveyor with scooping blades, said conveyor extending through said closed-loop trough and around said opening formed in said base.

5. The combination of claim 1 wherein said opening in said base through which said filtering device passes has a downwardly flaring substantially frustoconical shape.

* * * * *